United States Patent

Gödtner

[11] Patent Number: 5,619,882
[45] Date of Patent: Apr. 15, 1997

[54] PROCESS AND DEVICE FOR PRODUCING PHILLIPS-HEAD SCREWING TOOLS OR THE LIKE, ESPECIALLY IN THE FORM OF BITS

[75] Inventor: Werner Gödtner, Remscheid, Germany

[73] Assignee: Wera Werk Hermann Werner GmbH & Co., Wuppertal, Germany

[21] Appl. No.: 302,859

[22] PCT Filed: Mar. 9, 1993

[86] PCT No.: PCT/EP93/00530

§ 371 Date: Sep. 12, 1994

§ 102(e) Date: Sep. 12, 1994

[87] PCT Pub. No.: WO93/17814

PCT Pub. Date: Sep. 16, 1993

[30] Foreign Application Priority Data

Mar. 13, 1992 [DE] Germany .......................... 42 07 963.2
Mar. 13, 1992 [DE] Germany .......................... 42 07 964.0

[51] Int. Cl.⁶ ............................ B21D 22/00; B21D 22/21
[52] U.S. Cl. ............................ 72/356; 72/351; 72/361
[58] Field of Search ...................... 72/356, 361, 351, 72/402, 354.2, 353.2, 355.2, 355.4; 76/119, 108.1, 108.2; 83/98

[56] References Cited

U.S. PATENT DOCUMENTS 1,977,164  10/1934  Wilcox .
2,656,739  10/1953  Mansfield ................... 76/101
3,103,833   9/1963  Lejdegard .................. 72/402
3,124,876   3/1964  Putetti ...................... 72/356
3,566,664   3/1971  Schweizer ................. 72/354.2
4,463,587   8/1984  Werner ..................... 72/361

FOREIGN PATENT DOCUMENTS 1104795    4/1961  Germany .
1110997    7/1961  Germany .
2103053    9/1971  Germany .
1299662-A  3/1987  U.S.S.R. ................... 72/342.5
 892507    3/1962  United Kingdom ........... 76/119

Primary Examiner—Lowell A. Larson
Assistant Examiner—Rodney A. Butler
Attorney, Agent, or Firm—Martin A. Farber

[57] ABSTRACT

A process for producing Phillips-head screwing tools or the like, especially in the form of bits, by cold forming from a workpiece section (W) cut to length from a profiled rod. In order to produce bits of high precision, that the workpiece section (W) which is developed at one end with a hexagon profile and adjoining it with a section with supportable front end (16) is introduced, with axial spring-loaded support, into a press tool (P), whereupon the cheek plates (51) of this press tool (P) produce the Phillips-head shape or the like by a displacement towards the center which is controlled by a conical envelope surface (55) which tapers towards the front end (16).

21 Claims, 8 Drawing Sheets

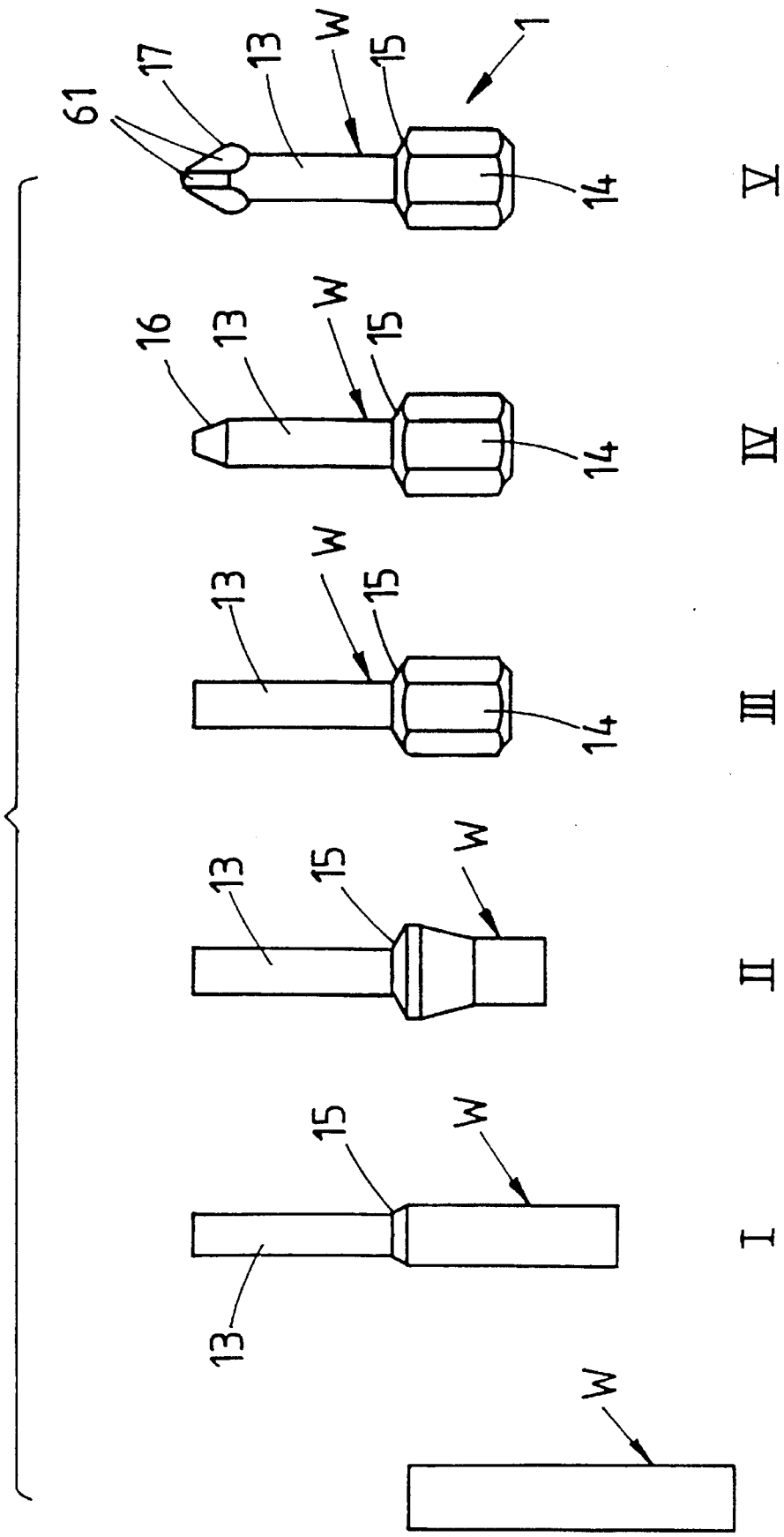

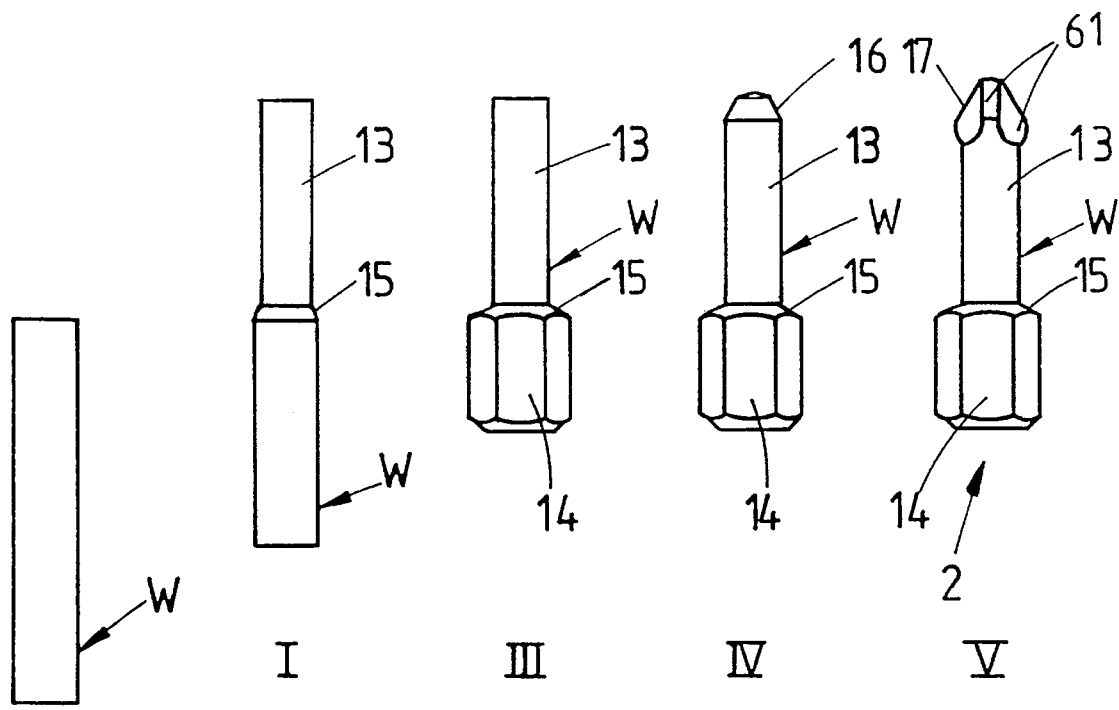
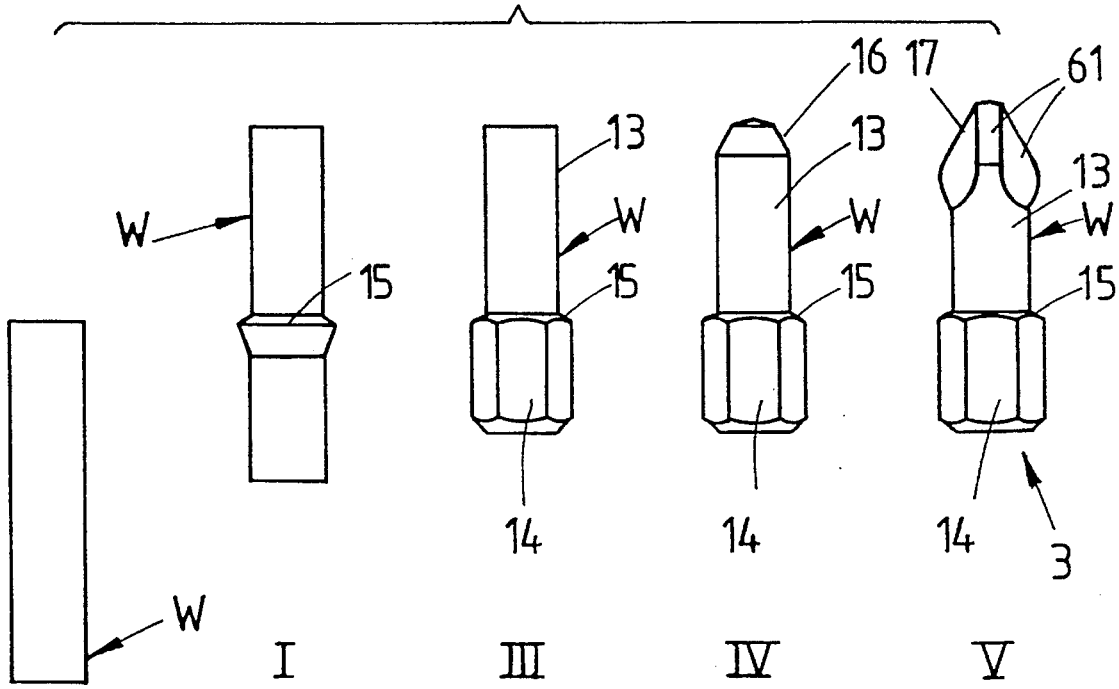

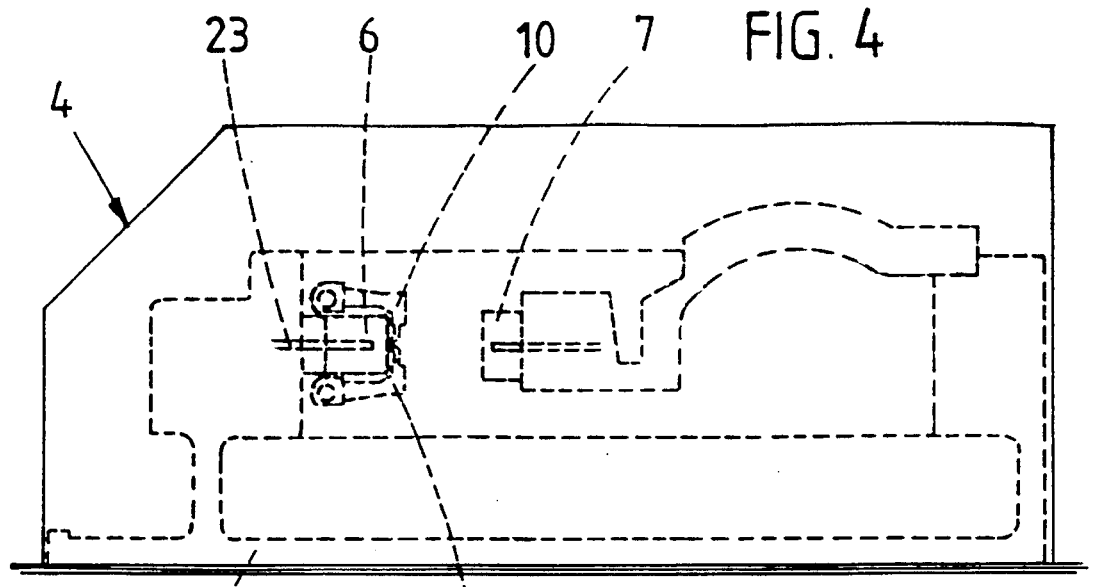
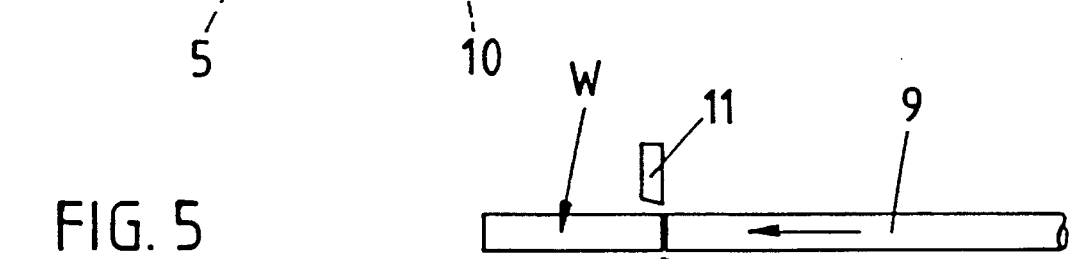
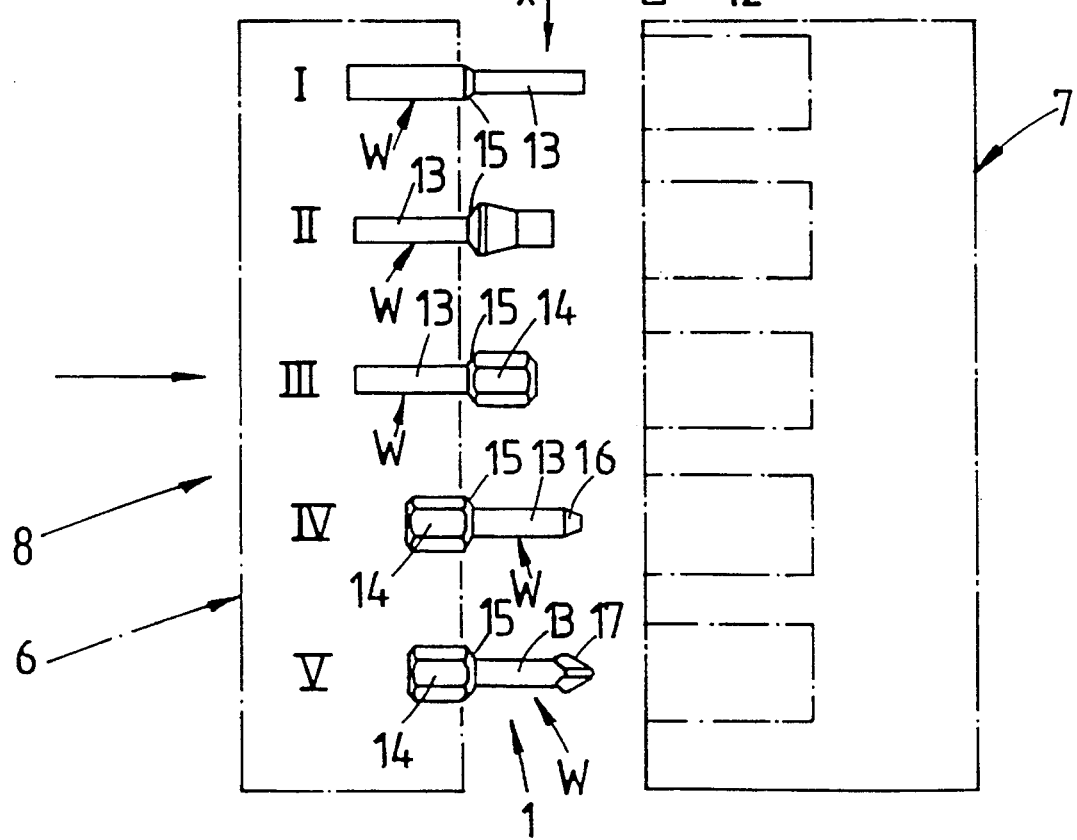

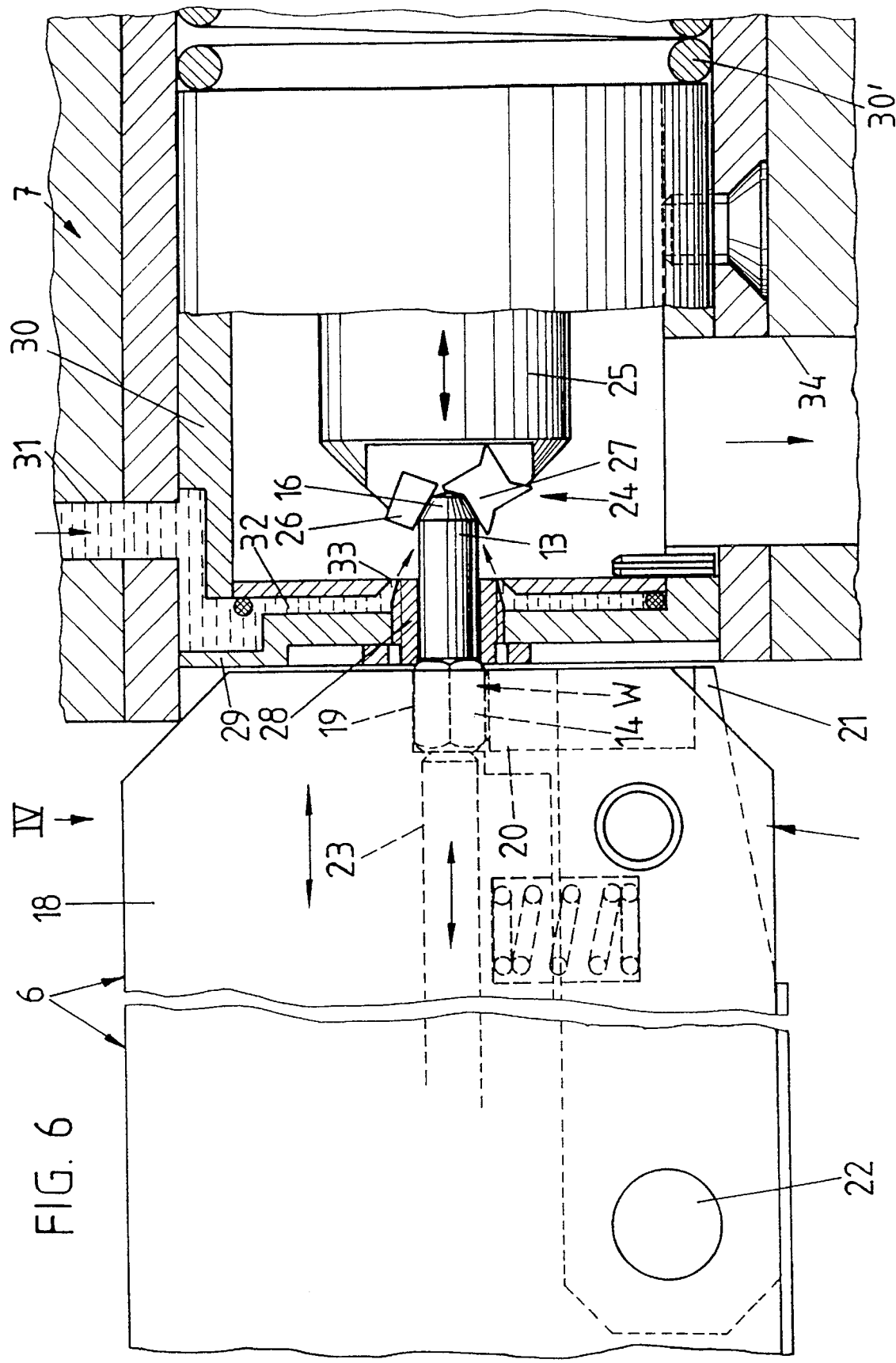

PROCESS AND DEVICE FOR PRODUCING PHILLIPS-HEAD SCREWING TOOLS OR THE LIKE, ESPECIALLY IN THE FORM OF BITS

FIELD AND BACKGROUND OF THE INVENTION

The present invention relates to a process and a device for producing Phillips-head screwing tools or the like, especially in the form of bits, by cold forming from a workpiece section cut to length from a profiled rod.

It is known to produce bits by starting from a profiled rod of hexagonal cross section which is cut to the length of the bits. The workpiece section is turned on a lathe producing a hexagon and a cylindrical section with spherical end. The part produced in this manner is then formed on its headed front end by the cheek plates of a press tool to a Phillips-head shape or the like. Since the workpiece section is subjected to an increase in length in this process, there is the problem of a bending of the workpiece section which is clamped during the forming, resulting in an increased number of rejects.

SUMMARY OF THE INVENTION

The object of the present invention is to provide a process and a device for carrying out the process in order to produce bits of high precision in a manner simple to manufacture without the disadvantage of the bending of the workpiece section in the press tool.

The object of the invention is achieved in the manner that the workpiece section, which is shaped at one end with a hexagon profile and, adjoining it, cylindrically with a supportable front end, is introduced, with axial spring-loaded support, into a press tool, whereupon the cheek plates of this press tool effect the forming into the Phillips-head profile or the like by displacement towards the center, which is controlled by a conical envelope surface which tapers towards the front end.

As a result of this development there is provided a process of this type by means of which Phillips-head screwing tools or the like, developed in the form of bits, can be produced with great precision. The problem of the workpiece section bending upon the forming is eliminated. This is achieved by the axial spring-loaded supporting of the workpiece section in the press tool. If, now, the Phillips-head profile or the like is produced by forming on the workpiece section by the displacement towards the center of the cheek plates of the press tool, the increase in length which takes place in this connection is compensated for by the spring-loaded support, without the increase in length leading to a bending, in particular, of the cylindrical section of the workpiece section. This means that the force of the spring-loaded supporting is so selected that the forces for bending are greater than the forces of the spring-loaded support. Furthermore, the tapered conical envelope surface assures a synchronous displacement of the cheek plates, together with a high precision of shaping. Another process step consists therein that the workpiece section which has been cut to length from a round rod profile is upset at one end to form a hexagon. All process steps, aside from the cutting to length, can be carried out by cold forming. The starting material for this is a round rod profile of corresponding quality. After the cutting to length of the workpiece section, it is imparted a hexagon by upsetting at one end. In order that suitable working ends are always present on the screwing tool produced by the process of the invention, a conical heading of the end of the workpiece section is effected before its introduction into the free space between the cheek plates. The front end produced by the cutting to length is therefore subjected to a separate machining prior to the shaping. In this way, a drive tip which always free of notch effect is created on the screwing tool. Without this machining process, the shear plane would otherwise lie in the region of the take-off. The formation by upsetting of the hexagon is advantageously effected in a multi-step press, in the manner that, first of all, approximately half the length is flow-pressed to a smaller cross section, whereupon the other part of the length which is of larger cross section is shaped, possibly in a press intermediate step, into a hexagonal section of about half the length. In this way, the pressing forces at one station of the multi-step press are prevented from leading to a kinking or the like. If the formation by upsetting of the hexagon section is effected in a press intermediate step, only about half of the length of larger cross section is transformed to a larger diameter within it. A further process step consists therein that with the flow pressing of half the length to a smaller cross section, the shoulder is formed for the frustoconical transition surface of the hexagon.

The device for carrying out the process in accordance with the method of the invention comprises a press tool both the press carriage and the die of which have a spring-loaded stop directed towards each other, the stop of the carriage serving to support the end surface of the hexagon and the other stop serving to support the front end. In this way, the workpiece section is optimally adjusted. Even differences in length of the workpiece section are compensated for hereby. Furthermore, the supporting of the workpiece section on both ends permits the use of a relatively simply shaped tool, together with the saving of manufacturing expenses for the press tool. In this connection, a measure is taken so that the spring forces are different. The spring force acting on the hexagon is preferably greater than the force which, via the corresponding stop, acts on the front end of the workpiece section. This takes into account the fact that the increase in length upon the forming of the front end extends substantially in the direction towards the front end, so that the lesser resistance is present there. It should furthermore be emphasized that the stop of the die is developed as a mandrel which sits against the flattened and headed front end of the section. This mandrel does not prevent the displacement towards the center of the cheek plates which produce by forming the Phillips-head profile or the like. It has been found advantageous for the mandrel to be mounted in a slide sleeve which is spring-loaded at one end in the same direction as the mandrel and at the other end presses the cheek plates into the open position. Accordingly, the slide sleeve performs a twofold function: On the one hand, it serves to receive the mandrel and, on the other hand, it represents the part which moves the cheek plates back into the open position. The spring loading of the slide sleeve is such that nevertheless the displacement towards the center of the cheek plates on the tapered conical envelope surface is made possible. Despite the displacement of the slide sleeve which takes place in this connection in direction opposite the compression spring acting on it, the mandrel always remains in supporting position with respect to the front end of the workpiece section. For a synchronized control of the cheek plates of the press tool upon the forming process, a common annular surface of the carriage acts on all the cheek plates, which are arranged along a circle. The construction of the press tool is characterized by the fact that the cheek plates develop their profiled press surfaces on the inner hollow wall which is opposite their envelope surface. In order to obtain different spring forces, the carriage-side stop is acted on by a package of Belleville springs. Therefore the lesser possibility of evasion of the spring-loaded support of the workpiece section is present there. Optimal control of the cheek plates results from the fact that the angle of the conical envelope surfaces is about 30°. In order that each cheek plate always moves on a prescribed course, the cheek plates are provided, on the conical surface envelope side, with slide guide ledges and leave between themselves, in the press end position, in each case slot spaces for the entrance of the material of the workpiece section which has been formed into ribs. Another function is fulfilled by the press tool in the manner that it is the station of a follow-up tool in front of which there is a heading station. In this way, it is possible to produce the headed front end of the workpiece section directly before the forming by the press tool. In detail, the heading station is developed in such a manner that it has a tool which cuts down (turns) the end. A further advantageous feature of the invention is that a stamping tool which can be introduced into the hexagon receiving hollow is associated with the clamping part of the heading station. Simultaneously with the heading of the front end, the hexagon can be imparted a desired stamping by the stamping tool. This can provide information as to the origin, size of the bit, etc. Too great a development of heat at the heading station is counteracted by a flushing-agent/coolant-feed channel in the part of the heading station having the cutting (turning) tool. At the same timer the chips are carried away from the heading station by the flushing/cooling agent. In order to effect a uniform flushing and thus a cooling of the workpiece section at the heading station, the flushing channel terminates as an annular nozzle around the workpiece section.

The heading station is of independent importance within the invention. In general, this invention relates to a device for the turning-down of a workpiece, particularly a front end of a workpiece. Such a device consists of a first assembly for receiving the tool and a second assembly for receiving a workpiece in the form of a clamped part. A rotary drive is provided, which produces rotation between the two assemblies. In this connection, either the tool receiver can be turned and the workpiece be stationary, or the workpiece can be turned and the tool be stationary. It is also conceivable for both assemblies to be driven in rotation. However, a version is preferred in which the workpiece is held fast and the tool is driven in rotation. The two assemblies are so aligned with each other that the workpiece is directed axially to the tool. At least one of the two assemblies can be displaced forward and backward in axial direction to the rotation. In this connection, the backward and forward displacement of the assembly can take place in synchronism with a machining station arranged in front or behind it. In the case of the last-mentioned manner of operation, the speed of displacement is generally not adapted to the machining speed of the turning tool. The object of the invention is, therefore, to permit the turning-down by a tool in a device mentioned above regardless of the speed of displacement. For this purpose, it is provided that the other assembly carries out an evasion movement at least in part during a work stroke in the same direction. If, for instance, the workpiece clamping part is movable in synchronism with a machining station arranged in front or behind it, then the assembly bearing the tool, which is also preferably the assembly driven in rotation, carries out an evasion movement. In this way, the axial displacement of the workpiece is made relative. The evading movement preferably takes place with slower speed than the forward displacement of the workpiece. By the difference in the two speeds, the machining feed for the turning can be adjusted. The feed can also take place during the rearward displacement. The evading movement then has a higher speed than the return displacement. In the special case, this then means that the tool is displaced faster than the workpiece. The feed is then formed from the difference between the two speeds.

BRIEF DESCRIPTION OF THE DRAWINGS

The process of the invention as well as the device for carrying out the process are explained below by way of example with reference to the drawings, in which:

FIG. 1 shows, alongside of each other, the process steps for producing a screwing tool developed as bit of bit size 1, FIG. 2 shows, also alongside of each other, the process steps for producing a screwing tool of bit size 2, FIG. 3 shows the process steps, alongside of each other, for producing a screwing tool of bit size 3, FIG. 4 shows, diagrammatically, a multi-step press for the production of the screwing tools, FIG. 5 shows, diagrammatically, the follow-up tool for the production of a screwing tool of bit size 1, FIG. 6 shows, partially in front view and partially in longitudinal section, the heading station of the follow-up tool with workpiece section introduced.

DETAILED DESCRIPTION OF THE PREFERRED EMBODIMENT

Figure 7:
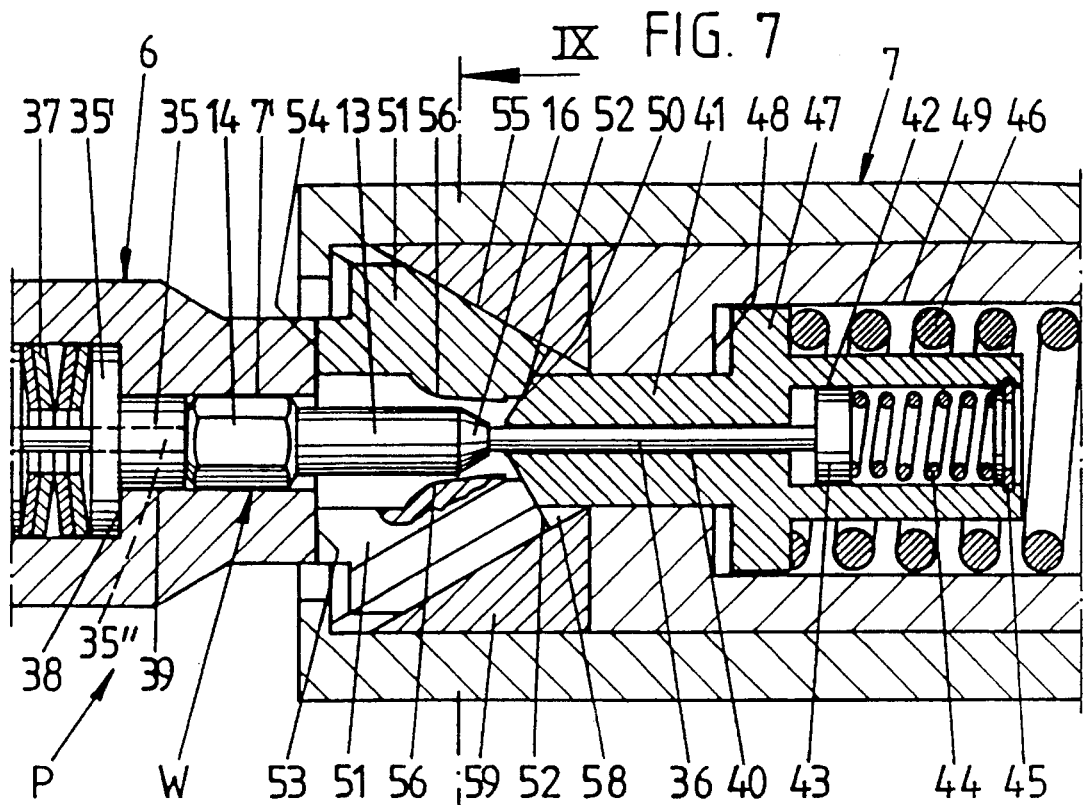
FIG. 7 is a longitudinal section through the pressing station having the cheek plates for the production of the Phillips-head profile, with workpiece section introduced and supported by spring loading, shown in the open position of the cheek plates.

FIGS. 1 to 3 show the different phases in the manufacture of screwing tools 1, 2 and 3 developed as bits of different bit size. In accordance with the embodiment shown, the manufacture is effected in a multi-step press 4. The latter has a machine frame 5 Which receives, aligned with each other, a horizontally displaceable carriage 6 and a die 7. Both the carriage 6 and the die are part of a follow-up tool, designated 8. This tool is passed through in the direction indicated by the arrow x by the workpiece section W which has been cut to length from a profiled rod 9 of circular cross section. Grippers 10, indicated in FIG. 4, see to the transport of the workpiece section from one station of the follow-up tool 8 to the other, possibly with the turning around of the workpiece section.

The cutting knives 11, 12 which effect the cutting to length, are not part of the follow-up tool 8, but are arranged in front of it.

For the manufacture of the screwing tool 1 (see FIG. 1) the multi-step press 4 is developed as a five-step press. After the cutting to length of a workpiece section W by the cutting knives 11, 12, flow pressing of approximately half the length of the workpiece section W to a smaller cross section is effected at the station I of the follow-up tool 8. Said length represents the cylindrical section 13 of the workpiece section W. Following this, the other part of the length of larger cross section is formed on its half adjoining the section 13 to a larger diameter in a press intermediate step. At station III of the follow-up tool 8, this stepped length of larger cross section is formed into a hexagon 14 the length of which corresponds approximately to half of the length of larger cross section present at station 1.

The shoulder 15 for the frustoconical transition surface of the hexagon 14 is formed already with the flow pressing of the half length to the smaller cross section.

At station IV, a conical heading of the front end 16 of the workpiece section W takes place. The next operating step consists in forming a Phillips-head profile 17 at the press station V of the follow-up tool 8.

If a screwing tool with bit size 2 (see FIG. 2) is to be produced, a four-step press is sufficient. After the cutting to length of the workpiece section W, the flow pressing takes place at station I with formation of a shoulder 15 and reduction of about half the length of the workpiece section W to a smaller cross section, which constitutes the section 13. Without press intermediate step, the other length of larger cross section is then formed shaped at station III to a hexagon section 14 of about half the length. At station IV the heading of the front end 16 is effected, it being formed into a Phillips-head profile at station V.

For the manufacture of a screwing tool of bit size 3 (see FIG. 3), one starts from a profiled rod of larger diameter. After the cutting-off of a workpiece section W, a shoulder 15 for the frustoconical transition surface of the hexagon 14 is formed at station I of a four-step press. The hexagon is then produced by the press intermediate step at station III so that no press intermediate step II is necessary in this version either. At station IV, the front end 16 is headed, it being transformed into a Phillips-head profile 17 at station V.

As can be noted from FIG. 5, a screwing tool 1 of bit size 1 is produced on the follow-up stage 8 of a five-step press. After each stroke of the carriage, the workpiece sections W pass from one station to the next, in which connection, by means of grippers 10 not shown in FIG. 5, a turning-around movement can be carried out in addition to the transfer.

Figure 11:
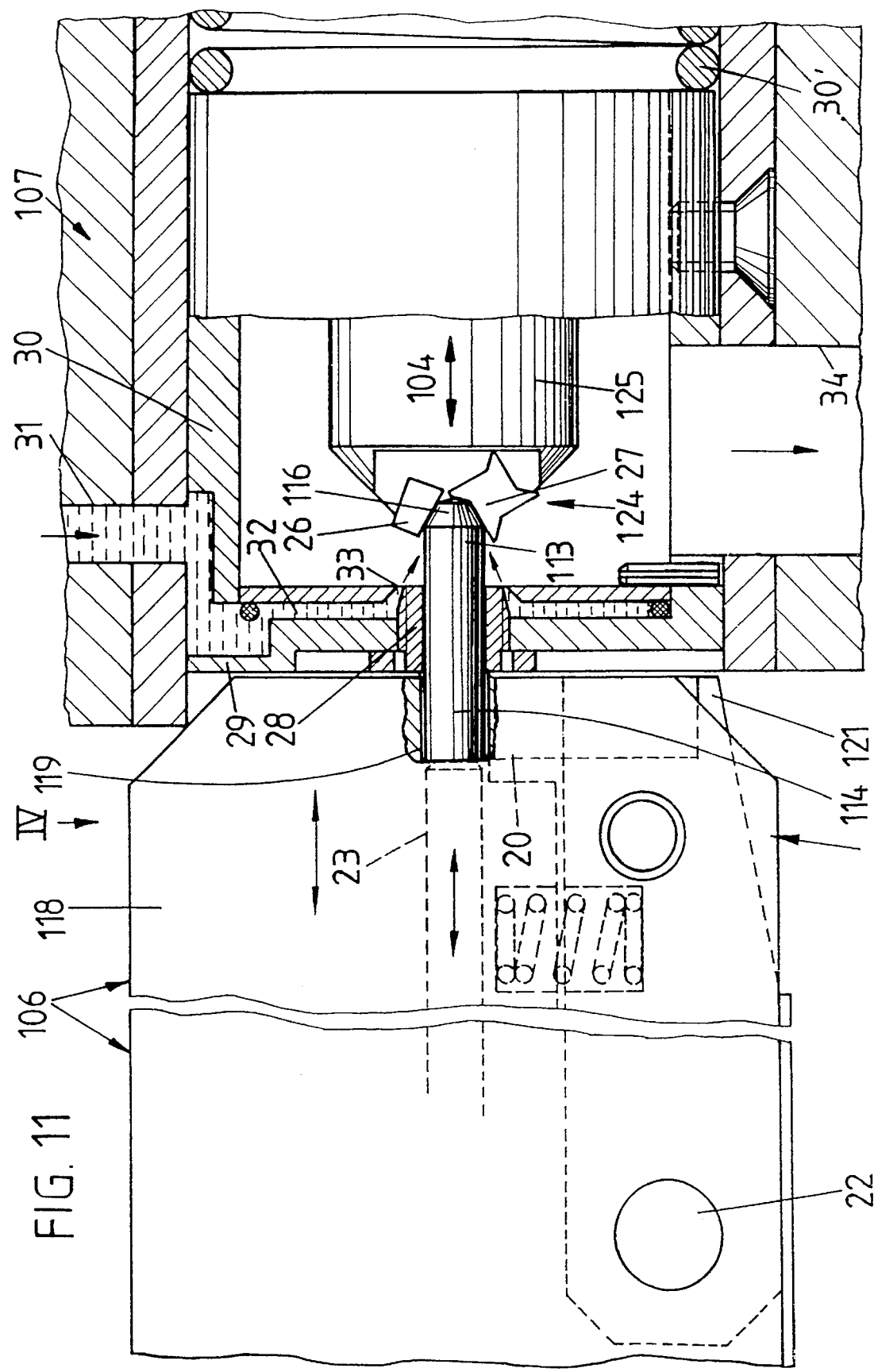
FIGS. 11 and 12 show an apparatus for forming a tool bit.
Figure 12:
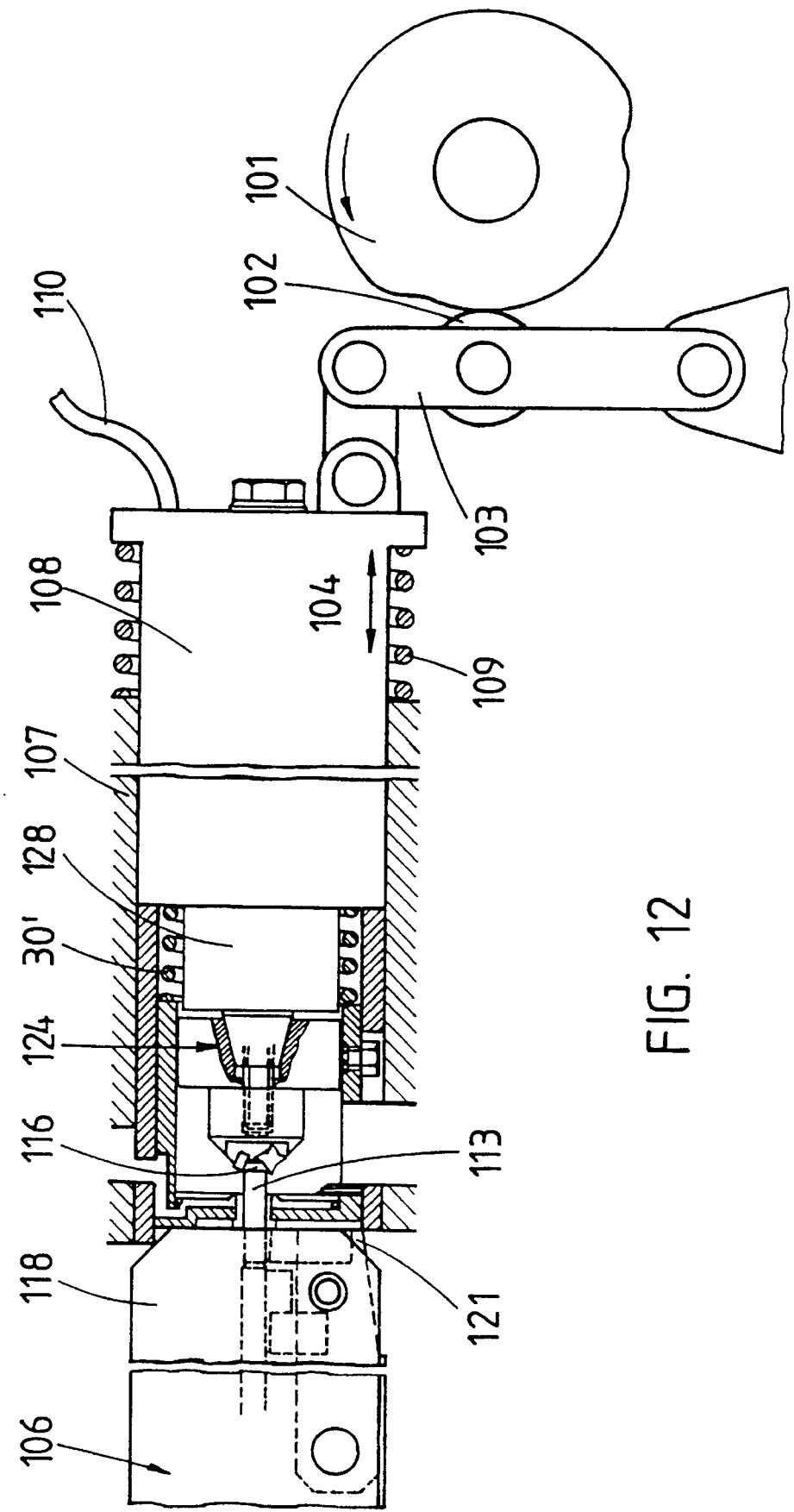

The heading station IV can be noted, in particular, from FIG. 6. Another heading station is shown in FIGS. 11 and 12. The heading station IV comprises, in detail, a clamping part 18 which is part of the reciprocating carriage 6. Within the clamping part 18 there is a central polygonal receiving hollow 19 for the hexagon 14 of a workpiece section W. Into the polygonal receiving hollow 19 there can be introduced a stamping tool 20, which is arranged on the free end of a lever 21 which is spring-loaded in a direction opposite its inward swinging movement. The lever is turnable around a pivot pin 22 on the carriage 6. Thus, this stamping tool 20 contributes further to the clamping of the workpiece section W. The polygonal receiving hollow is aligned with an ejector ram 23 which is controlled as a function of the machine cycle by a cam disk (not shown). By means of the ejection ram 23 the workpiece section W is moved out of the polygonal receiving hollow 19 upon the rearward displacement of the carriage 6 which is displaceable in the direction indicated by the double-ended arrow, it being transferred in this connection to the corresponding grippers 10. Instead of what is shown in the drawing, two or more stamping tools could also act on the hexagon. The additional stamping tools would then be arranged spaced angularly apart in such a manner with respect to the stamping tool that they effect their stamping on separate surfaces of the hexagon.

On the die side, the heading station IV has a lathe tool which turns down the front end 16. A rotatingly driven knife holder 25 which is directed coaxial to the polygonal receiving hollow 19 holds two knives 26 and 27 which, upon a rotation of the knife holder 35, produce a frustoconically tapering front end 16 on the cylindrical section 13 of the workpiece section W (see FIG. 6). By the double arrow it is indicated that the knife holder 25 can carry out a reciprocating motion. Thus it is possible for the knife holder 25 to move in direction towards the carriage 6 upon forward displacement of the carriage.

Upon the forward displacement of the clamping part 18 in the direction of the tool 24, the section 13 passes in form-locked manner through a bearing bushing 28 on the die side. The bearing bushing is received by a flange plate 29 on the die side. This plate is continued into a bushing 30 which surrounds the tool 24 and, in its turn, is introduced into the die 7 and urged by a compression spring 30' in the direction towards the carriage 6. The spring-loaded bushing 30 sees to it that the hexagon 14 is pressed against the ejector ram 23 via the bearing bushing 28. A flushing-agent/cooling-agent feed channel 31 debouches into the bushing 30, it continuing in the region of the flange plate 29 into an annular channel 32. The latter terminates in an annular nozzle 33 which concentrically surrounds the bearing bushing 28. From this nozzle, the flushing agent/cooling agent passes to the front end 16 of the workpiece section W. The chips produced upon the cutting are transported away by the cooling agent/flushing agent through an outlet opening 34 in the bushing 30 and the die 7.

The stamping tool P representing station V of the follow-up tool 8 has spring-loaded stops 35, 36 directed towards each other on the carriage side and die side. The stop on the carriage 6 rests against the end surface of the hexagon 14, while the other stop 36 serves to support the front end 16 of the workpiece section W. The spring forces acting on the stops 35, 36 are different. The carriage-side stop 35 is acted by a package of Belleville springs 37 which rests against a collar 35' of larger cross section of the stop 35. The displaceability of the stop 35 is limited by an annular shoulder 38 of the stepped bore 39 which receives the stop 35 and spring package 37. The carriage-side receiving hollow 7' for the insertion of a workpiece section W adjoins said stepped bore 39. A spring-loaded ejector finger 35" passes through the stop 35 and comes against the end surface of the hexagon. The spring force acting on the ejector finger 35 is weaker than that of the stop 36, so that the hexagon 14 does not give up its support against the stop 35.

The stop 36 of the die 7 is, on the other hand, developed as a mandrel 36 which comes onto the flattened, headed front end 16 of the section 13, the diameter of the mandrel being about half as great as that of the section 13. The mandrel-like stop 36 is guided in a bore 40 of a slide sleeve 41 which bore is coaxial to the stop 35. The bore 40 debouches into a chamber 42 of larger cross section, within which the piston-like collar 43 of the stop 36 moves. A compression spring 44 acts with its one end against the collar 43 while the other end of the compression spring rests against a spring ring of the slide sleeve 41. The slide sleeve 41 is also urged by a compression spring 46 in the direction towards the workpiece section W. The displacement end stop for the slide sleeve 41 forms a collar 47 surrounding the central section of said sleeve, which collar can rest on a shoulder 48 of a stepped bore 49.

The free end 50 of the slide sleeve 41 has a conical envelope surface and acts in opening direction on four cheek plates 51 arranged at the same angle apart. This is done by surface application of the end 50 against the facing wall 52 of the cheek plates 51.

A common annular surface 53 of the carriage 6 acts against the facing end surface 54 of the cheek plates 51. In their position which effects the forming, the cheek plates 51 of the press tool P pass, by joint displacement towards the center, against a conical envelope surface 55 which tapers down towards the front end 16 of the workpiece section W. The angle of the conical envelope surfaces with respect to the longitudinal axis of the cone or workpiece section W is about 30°.

Figure 8:
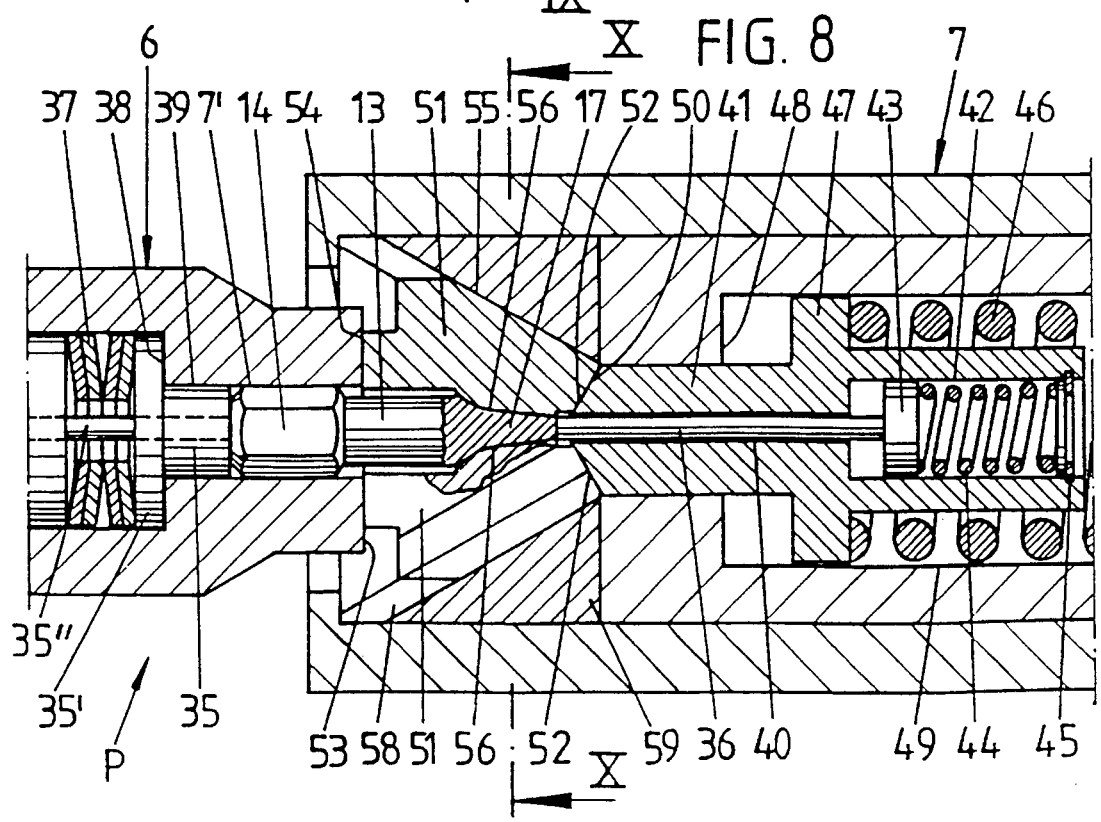
FIG. 8 is a view corresponding to FIG. 7, but in the forming position of the cheek plates.

The cheek plates 51 then form, on the wall of the inner hollow which is opposite their outer surface and rests against the conical outer surface 55, profiled pressing surfaces 56 which produce the Phillips-head profile 17 upon the displacement towards the center of the press cheeks. The displacement towards the center is caused by the forward movement of the carriage 6 in the direction of the die 7, the annular surface 53 of the carriage 6 acting jointly on the end surface 54 of the cheek plates 51. The latter can carry out a superimposed longitudinal and radial and movement as a result of the conical envelope surface 55, the pressing surfaces 56 passing continuously into the material of the front end 16 and of the adjoining region of the section and effecting the forming thereof; see FIG. 8. The increase in length of the front end 16 and of the adjacent zone of the section 13 which takes place thereby is compensated for by displacement, in particular, of the stop 36 which can move away due to the lesser spring load. A slight displacement can, in this connection, take place also on the part of the stop 35.

Figure 9:
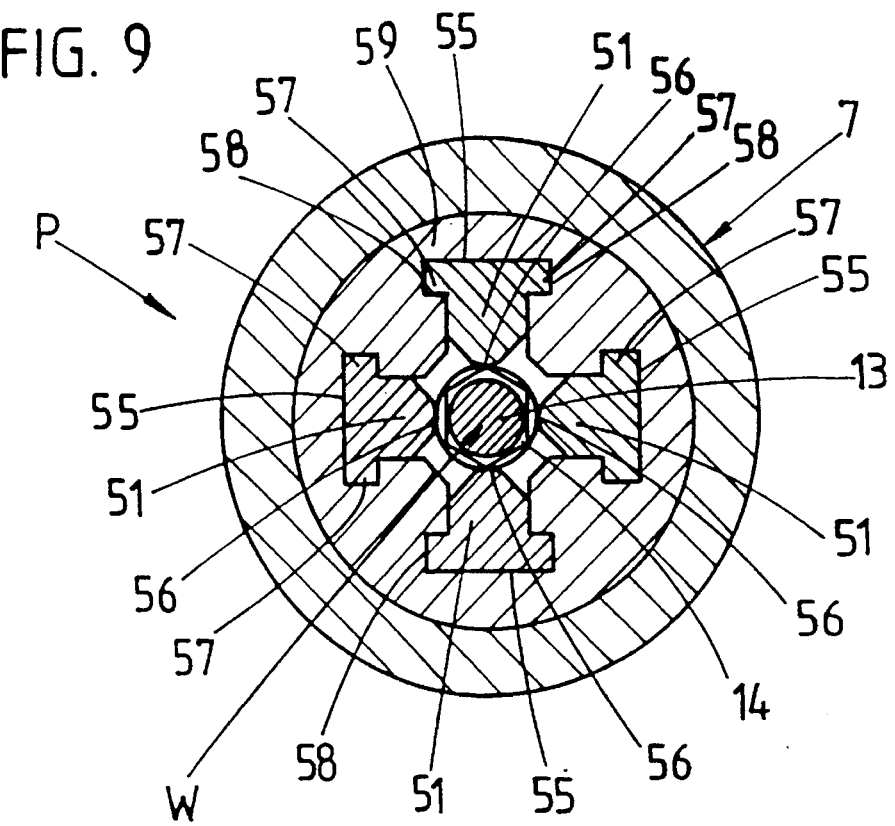
FIG. 9 is a section along the line IX—IX of FIG. 7.
Figure 10:
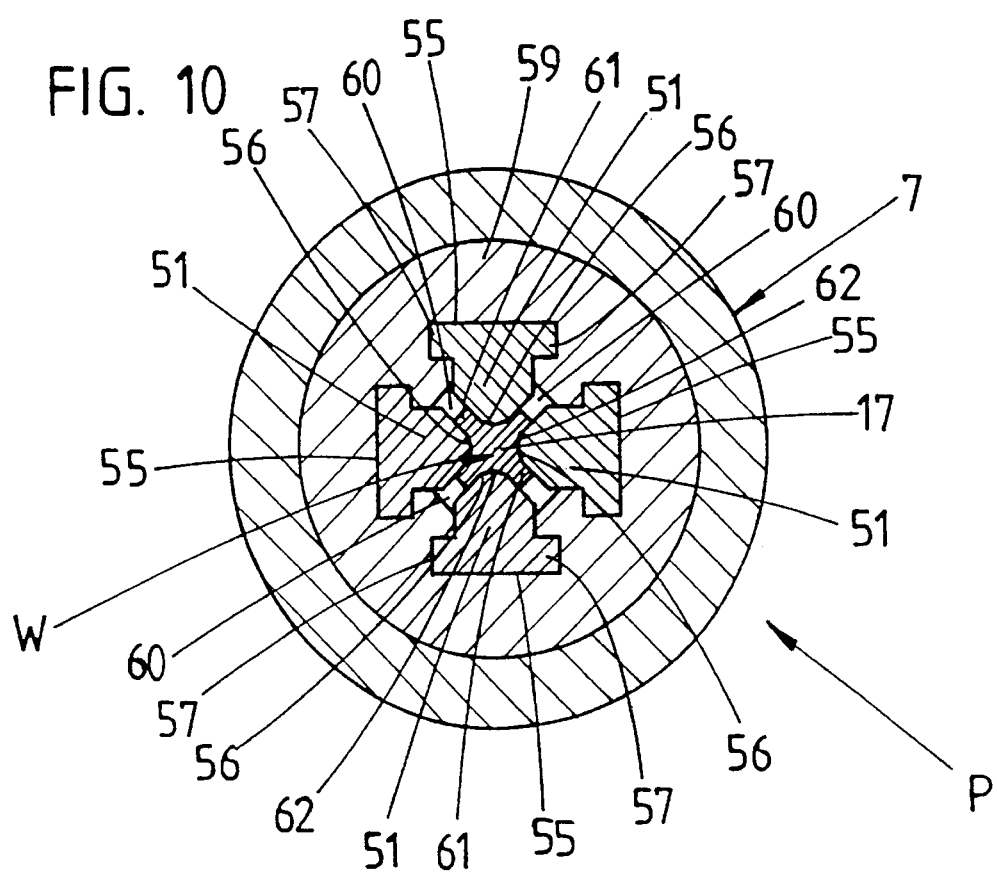
FIG. 10 is a section along the line X—X of FIG. 8.

As can be noted, in particular, from FIGS. 9 and 10, the four cheek plates 51, which are arranged at an equal angle apart, have, on the side of the conical envelope surface, laterally protruding slide guide ledges 57 which enter into guide grooves 58 of corresponding shape in the die 7 or an insert piece 59 thereof. Cheek plates 51 which are adjacent to each other leave between each other slot spaces 60 for the entrance of the material of the workpiece section W which is formed into ribs 61. Accordingly, the grooves 62 are produced by the pressing surfaces 56 of the cheek plates 51, grooves 62 and ribs 61 supplementing each other to produce the Phillips-head profile 17.

During the backward movement of the carriage 6 out of the pressing position, the workpiece section W can then be removed by corresponding grippers 10, whereupon a workpiece section W is transferred by the heading station IV.

The bit or the like produced in accordance with the process of the invention is characterized by optimal strength, high precision and a flow pattern of the material of its own, in such a manner that—in contradistinction to the prior art—the course of the fiber up into the drive tip is not interrupted by chip-removing machining.

If the working end of the bit is to be imparted a torn profile, the corresponding press tool could be provided at station IV, while a bevel is produced at station V.

The device shown in FIGS. 11 and 12 serves for the cutting by turning of a workpiece. The front end of a workpiece is preferably turned. One of the above-mentioned heading stations can be concerned here. Such a device has a first assembly 124 and a second assembly 118. In the embodiment shown, the assembly 118 is shifted in the direction of the double-ended arrow with respect to the die 7 or 107. The displacement is effected preferably in synchronism with a machining station located in front or behind, namely in axial direction to the rotary movement of the first assembly 124, which is equipped in the manner which has been explained in detail in particular with reference to FIG. 6. The assembly 118 is part of a carriage 6 and bears a workpiece 113 the front end 116 of which is to be turned down. The workpiece 113 is clamped by its shank end 114 in an opening 119 by means of a chuck 121.

The assembly 124 is arranged displaceably in a die 107. The direction of displaceability of the assembly 124 agrees with the axis of the rotary drive 125. By the rotary drive 125 the knives 127 rotate around the axis of rotation. The workpiece 113 is also clamped coaxial to the axis of rotation. The assembly 124 is spring-loaded against the die 107 by means of a spring 109. The assembly 124 is driven in the direction of the arrow 104 via a cam disk 101 and a link mechanism 103/102 in synchronism with the forward and backward movement of the assembly 118.

The drive of the cam disk 101 is synchronized for this purpose with the drive of the carriage 6, 106. The movement of the two assemblies 124 and 118 takes place, at least in part, in the same direction during the operating stroke.

At the start of the operating stroke, the difference between the two speeds is so adjusted that the front end 116 of the workpiece 113 moves with relatively high speed towards the knives 27 of the assembly 124. As soon as the front end 116 of the workpiece 113 has reached the knives, the evasion movement of the assembly 124 is accelerated, so that the relative movement is slowed down. The relative movement, which corresponds to the difference between the speeds of the two assemblies, is then so adjusted that it corresponds to the operating feed of the turning device. The relative movement is retained with this speed until the turning has been completed. Then, either the evading movement of the assembly 124 is accelerated, or the displacement of the assembly 118 so adjusted that it is delayed at this time.

If the machining by turning is to take place also during the return displacement, the relative movement of the two assemblies with respect to each other can be retained in the amount of the feed during the entire operating stroke. During the return stroke, the assembly 124 then moves with a higher speed than the assembly 118. The drive 125 of the knives 27 can be effected by an electric motor; a current lead is designated 110 in FIG. 12.

The device is particularly suitable for the turning (cutting) of rod-shaped workpieces. Such a workpiece is clamped with its axis coaxial to the axis of rotation of the rotating knives. The workpiece is machined with the knives from the front surface of the workpiece with the speed of the feed, the relative movement of the two assemblies to each other.

With regard to the more detailed development of the device of FIG. 11, reference is had to what has been stated in connection with FIG. 6.

I claim:

1. A process for producing Phillips-head screwing tools and the like, particularly in the form of bits, by cold forming of a workpiece section which has been cut to length from a profiled rod, comprising the steps of:

developing the workpiece section at one end with a hexagonal section having a profile of a hexagon and adjoining same with a cylindrical section with a supportable front end opposite said one end, and introducing the workpiece section into a press tool, and providing a first axially resilient support at said one end at an end surface of the hexagonal section and a second axially resistant support at the supportable front end, spring force of said first resilient support differing from a spring force of said second resilient support, whereupon cheek plates of said press tool effect forming to the Phillips-head profile and the like by a displacement towards a center which is controlled by a conical envelope surface which tapers towards the front end, both of said axially resilient support compensating for axial distension of the workpiece section resulting from displacement of the cheek plates.

2. A process according to claim 1, wherein the cutting step comprises cutting the workpiece section to length from a round profiled rod, and the developing step comprises upsetting said workpiece section at said one end to form the hexagon.

3. A process according to claim 1, comprising the step of providing a conical heading of the front end of the workpiece section before it is introduced into a free space between the cheek plates.

4. A process according to claim 2, wherein the step of upsetting to form the hexagon is effected in a multi-step press by first of all flow-pressing approximately half the length of the workpiece section into a smaller cross section, and a partial length of larger cross section is formed into the hexagon of approximately half the length.

5. A process according to claim 4, further comprising, with the flow-pressing of said half the length to the smaller cross section, the step of forming a shoulder for a frusto-conical transition surface of the hexagon.

6. A process according to claim 4, further comprising a press intermediate step for forming the partial length of larger cross section into the hexagon.

7. A process according to claim 6, wherein the press intermediate step transforms only about half of the partial length of larger cross section into a larger diameter.

8. A device for producing Phillips-head screwing tools and the like particularly in the form of bits by cold forming from a workpiece section which has been cut to length from a profiled rod, is provided at a front end of the workpiece with a conical envelope surface, and is provided with a hexagonal section opposite said conical envelope surface, comprising a press tool having cheek plates effecting forming of a Phillips-head profile and the like by a displacement towards a center of the workpiece section, the displacement being controlled by the conical envelope surface which tapers towards the front end of the workpiece section, the device further comprising a carriage and die of said press tool, both said carriage and said die of said press tool having a first and a second stop, respectively, spring-loaded in directions towards each other, and wherein the first stop of the carriage serves as a support at an end surface of the hexagonal section of the workpiece section, and the second stop serves to support the front end of the workpiece section; and said first stop has a first axially resistant support and said second stop has a second axially resistant support, a spring force of said first resilient support differing from a spring force of said second resilient supports, both of said axially resistant supports compensating for axial distension of the workpiece section resulting from displacement of the cheek plates.

9. A device according to claim 8, wherein the spring-loading forces are of different size.

10. A device according to claim 8, wherein the stop of the die is developed as a mandrel which comes against a flattened, headed shape of said front end of the workpiece section.

11. A device according to claim 8, wherein the stop of the die is a mandrel which, lies in a slide sleeve which is spring-loaded at one end in same direction as the mandrel and at the other end presses the cheek plates into an open position.

12. A device according to claim 8, further comprising a common annular surface of the carriage which acts synchronously on all cheek plates, which are arranged along a circle.

13. A device according to claim 8, wherein the cheek plates form their profiled pressing surfaces on an inner hollow opposite their outer surface.

14. A device according to claim 8, further comprising a package of Belleville springs, and wherein the carriage-side stop is acted on by said package of Belleville springs.

15. A device according to claim 8, wherein the cheek plates have conical envelope surfaces, and an angle of the conical envelope surfaces is about 30°.

16. A device according to claim 15, wherein the cheek plates are provided, on a side of their conical envelope surfaces, with slide guide ledges and, in a pressing end position, leave between them, in each case, slot spaces for entrance of material of the workpiece section which has been shaped into ribs.

17. A device according to claim 8, further comprising a follow-up tool, and a heading station, and wherein the press tool is a station of said follow-up tool in front of which said heading station is arranged.

18. A device according to claim 17, further wherein the heading station has a turning tool which turns (cuts down) the front end.

19. A device according to claim 17, further comprising:

a clamping part of the heading station having a hexagon receiving hollow;

a stamping tool which can be introduced into the hexagon receiving hollow and is associated with the clamping part.

20. A device according to claim 18, comprising a flushing-agent/cooling-agent feed channel in a part of the heading station bearing the turning tool.

21. A device according to claim 20, wherein the channel terminates as an annular nozzle around the workpiece section.

* * * * *